(12) United States Patent
Storck, III et al.

(10) Patent No.: US 12,503,078 B2
(45) Date of Patent: Dec. 23, 2025

(54) VEHICLE GLASS CLEARING MANAGEMENT SYSTEM

(71) Applicant: GM Global Technology Operations LLC, Detroit, MI (US)

(72) Inventors: Phillip C. Storck, III, Washington, MI (US); Michael Andrew Gutierrez, Dearborn Heights, MI (US); James C. O'Kane, Shelby Township, MI (US); Gerard Parij, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 243 days.

(21) Appl. No.: 18/466,231

(22) Filed: Sep. 13, 2023

(65) Prior Publication Data

US 2025/0083643 A1    Mar. 13, 2025

(51) Int. Cl.
| | | |
|---|---|---|
| *B60S 1/08* | (2006.01) | |
| *B60S 1/48* | (2006.01) | |
| *B60S 1/54* | (2006.01) | |

(52) U.S. Cl.
CPC ............ *B60S 1/0896* (2013.01); *B60S 1/482* (2013.01); *B60S 1/486* (2013.01); *B60S 1/548* (2013.01)

(58) Field of Classification Search
CPC ........ B60S 1/0896; B60S 1/482; B60S 1/486; B60S 1/548
See application file for complete search history.

(56) References Cited

U.S. PATENT DOCUMENTS

| | | | |
|---|---|---|---|
| 9,409,549 B2 | 8/2016 | Yopp et al. | |
| 2007/0056947 A1* | 3/2007 | Damian | ................ B60S 1/026 |
| | | | 219/203 |
| 2019/0047522 A1* | 2/2019 | Giraud | .................... B60S 1/524 |
| 2019/0322245 A1 | 10/2019 | Kline et al. | |
| 2020/0391576 A1* | 12/2020 | Ostrowski | ................ B60J 1/002 |

FOREIGN PATENT DOCUMENTS

| | | | | |
|---|---|---|---|---|
| DE | 102014218984 A1 | 3/2015 | | |
| DE | 112019002097 T5 | 3/2021 | | |
| FR | 3049246 A1 * | 9/2017 | ................ B60S 1/08 |

OTHER PUBLICATIONS

FR3049246A1 machine translation (Year: 2016).*
German Application No. 10 2023 130 515.8; German Office Action dated May 6, 2024; 4 pages.

* cited by examiner

*Primary Examiner* — Todd Melton
*Assistant Examiner* — Oliver Tan
(74) *Attorney, Agent, or Firm* — CANTOR COLBURN LLP

(57) ABSTRACT

A vehicle includes a glass clearing system that performs method of clearing a glass surface of a vehicle. The vehicle includes a glass surface. The glass clearing system includes a glass clearing device and a processor. The glass clearing device is configured for clearing a glass surface. The processor receives a signal from a remote device indicative of an instruction for operating the glass clearing device, selects the glass clearing device, and activates the glass clearing device to clear the glass surface based on the instruction.

20 Claims, 4 Drawing Sheets

VEHICLE GLASS CLEARING MANAGEMENT SYSTEM

INTRODUCTION

The subject disclosure relates to clearing glass surfaces of a vehicle, and in particular, to a system and method for remote operation of a glass clearing system of the vehicle.

A glass surface, such as a windshield, of a vehicle can accumulate particles that obscure vision and/or reduces a quality of a view through the surface. Various devices, such as wipers, heating wires, etc., can be used to remove these particles. However, these devices are operated when the driver is behind the wheel. An obscured glass surface when the driver gets in the vehicle can cause the driver to have to wait until the devices have cleared the glass sufficiently. Accordingly, it is desirable to provide a clearing system that operates when the driver or user is remote from the vehicle.

SUMMARY

In one exemplary embodiment, a method of clearing a glass surface of a vehicle is disclosed. A signal is received at a glass clearing system of the vehicle from a remote device, wherein the signal is indicative of an instruction for operating a glass clearing device of the glass clearing system. The glass clearing device is selected. The glass clearing device is activated to clear the glass surface based on the instruction.

In addition to one or more of the features described herein, the instruction includes one of a configuration for an automatic operation the glass clearing system and manually operating the glass clearing system.

In addition to one or more of the features described herein, the manual instruction includes at least one of selecting the glass clearing device, activating the glass clearing device, and deactivating the glass clearing device.

In addition to one or more of the features described herein, the method further comprising providing to the remote device at least one of an image of the glass surface, and an environmental parameter indicative of a quality of view through the glass surface.

In addition to one or more of the features described herein, the method further includes sending a notification to a user when one of at a selected time prior to a predicted key-on event, a quality of view through the glass surface meets an obscuration criterion, and the glass clearing device is turned off.

In addition to one or more of the features described herein, the method further includes shutting off the glass clearing device when one of a time for which the glass clearing device is activated exceeds a selected time period, a charge state of a battery of the vehicle meets a charge state criterion, and the vehicle is expected to be in stationary for a selected amount of time.

In addition to one or more of the features described herein, the glass clearing device includes at least one of a windshield wiper, an air conditioning, a heated glass, a compressed air nozzle, and a window washer fluid system.

In another exemplary embodiment, a glass clearing system for a vehicle is disclosed. The glass clearing system includes a glass clearing device for clearing a glass surface, and a processor. The processor is configured to receive a signal from a remote device indicative of an instruction for operating the glass clearing device, select the glass clearing device, and activate the glass clearing device to clear the glass surface based on the instruction.

In addition to one or more of the features described herein, the instruction is one of a configuration for an automatic operation the glass clearing system and a manual instruction for operating the glass clearing system.

In addition to one or more of the features described herein, the manual instruction includes at least one of selecting the glass clearing device, activating the glass clearing device, and deactivating the glass clearing device.

In addition to one or more of the features described herein, the processor is further configured to provide to the remote device at least one of a camera image of the glass surface and an environmental parameter indicative of a quality of view through the glass surface.

In addition to one or more of the features described herein, the processor is further configured to send a notification to a user when one of at a selected time prior to a predicted key-on event, a quality of view through the glass surface meets an obscuration criterion, and the glass clearing device is turned off.

In addition to one or more of the features described herein, the processor is further configured to shut off the glass clearing device when one of a time for which the glass clearing device is activated exceeds a selected time period, a charge state of a battery of the vehicle meets a charge state criterion, and the vehicle is expected to be in stationary for an selected amount of time.

In addition to one or more of the features described herein, the glass clearing device includes at least one of a windshield wiper, an air conditioning unit, a heated glass, a compressed air nozzle, and a window washer fluid system.

In yet another exemplary embodiment, a vehicle is disclosed. The vehicle includes a glass surface, a glass clearing device for clearing the glass surface, and a glass clearing system for communication with a remote device and the glass clearing device. The glass clearing system including a processor configured to receive a signal from the remote device indicative of an instruction for operating the glass clearing device, select the glass clearing device, and activate the glass clearing device to clear the glass surface based on the instruction.

In addition to one or more of the features described herein, the instruction is one of a configuration for an automatic operation the glass clearing system and a manual instruction for operating the glass clearing system.

In addition to one or more of the features described herein, the manual instruction includes at least one of selecting the glass clearing device, activating the glass clearing device, and deactivating the glass clearing device.

In addition to one or more of the features described herein, the processor is further configured to provide to the remote device at least one of a camera image of the glass surface, and an environmental parameter indicative of a quality of view through the glass surface.

In addition to one or more of the features described herein, the processor is further configured to send a notification to a user when one of at a selected time prior to a predicted key-on event, a quality of view through the glass surface meets an obscuration criterion, and the glass clearing device is turned off.

In addition to one or more of the features described herein, the notification is indicative of the quality of view of the glass surface when the glass clearing device is turned off.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
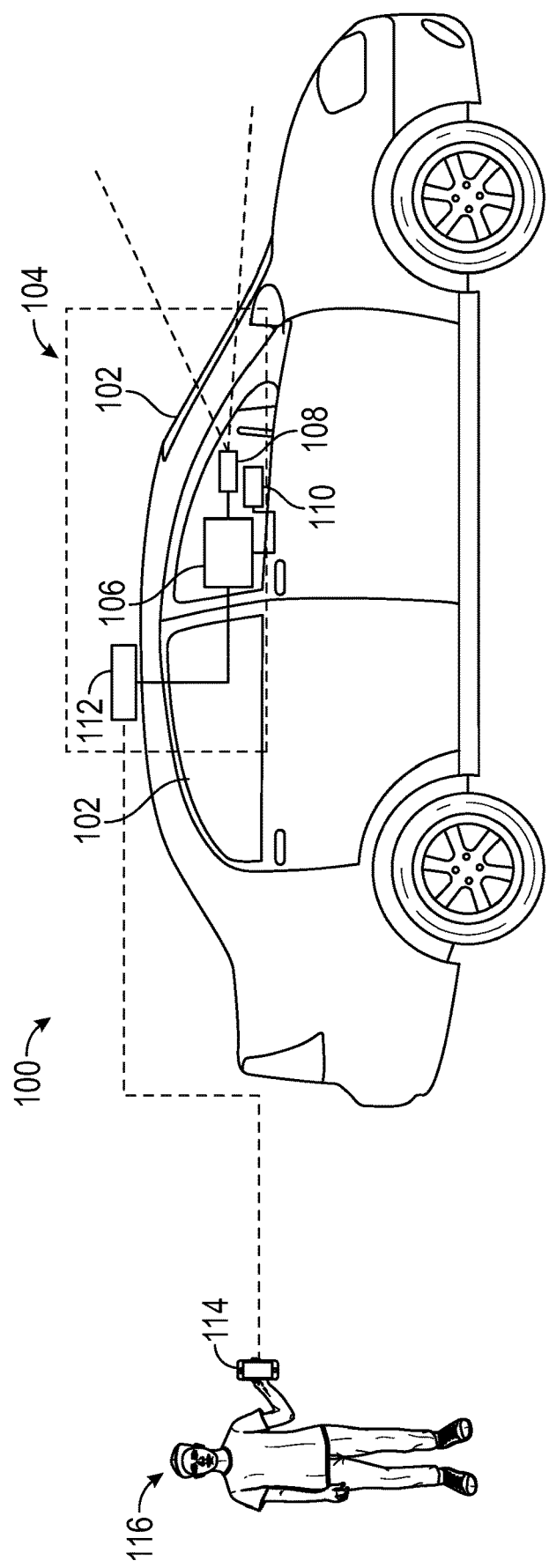
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment, FIG. 1 shows a vehicle 100. The vehicle 100 includes a glass surface 102 that can collect particles, such as dirt, dust, humidity, rain, snow, fog, etc., that can obscure or reduce a view through the glass surface. The glass surface 102 can be a windshield of the vehicle 100, a side window, a rear window, etc.

The vehicle 100 includes a glass clearing system 104 for removing particles from the glass surface 102 and/or for improving a view through the glass surface. The glass clearing system 104 includes a controller 106, a sensor 108 for determining a degree of obscuration of the glass surface or quality of view through the glass surface, one or more clearing devices 110 for removing the particles from the glass surface 102, and a communication device 112. The one or more clearing devices 110 can include, but are not limited to, windshield wipers, a defroster, a dehumidifier, an air conditioning unit, heated glass, heating wires, a compressed air nozzle, a window washer fluid system, etc. The controller 106 can be used to control activation and/or deactivation of the one or more clearing devices 110.

The controller 106 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 106 may include a non-transitory computer-readable medium that stores instructions which, when processed by one or more processors of the controller 106, implement a method of setting up or configuring an automated clearing plan and operating the clearing system based on the configuration, according to one or more embodiments detailed herein.

The sensor 108 can be a camera that obtains a view through the glass surface. Alternatively, sensor 108 can be a device that measures various atmospheric or environmental parameters, such as a humidity, a temperature, a dew point, etc., that are indicative of a quality of view through the glass surface.

The communication device 112 communicates data between the glass clearing system 104 and a remote device 114, such as a mobile communication device. In FIG. 1, a user 116 is in possession of the remote device 114. The user 116 can receive and review data and queries from the communication device 112 via the remote device 114 and provide instructions back to the communication device via the remote device. Thus, the user 116 can instruct the glass clearing system 104 to establish a clearing schedule or clearing regimen and to perform a method for clearing the glass based on various clearing criteria established by the user. The clearing schedule can be operated while the user is away from the vehicle.

Figure 2:
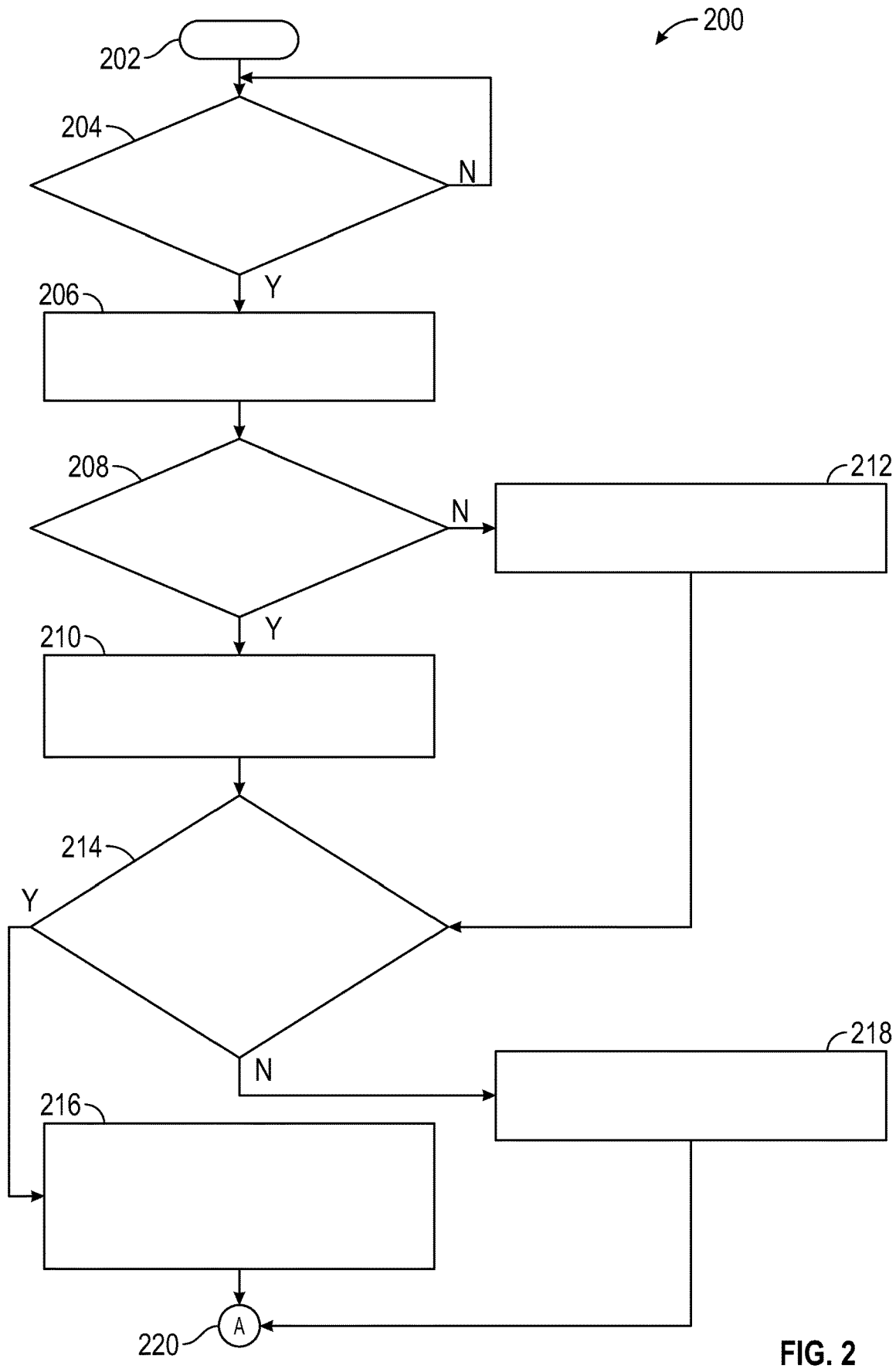
FIG. 2 is a flowchart of a method for configuring the glass clearing system.

FIG. 2 is a flowchart 200 of a method for configuring the glass clearing system 104. The method begins in box 202. In box 204, a user decides whether to opt into a glass monitoring program for clearing the one or more of the glass surfaces. The user can opt in through the remote device 114. If the user does not opt in, the method returns to box 202. Otherwise, the method proceeds to box 206.

In box 206, the default state of the glass clearing program is set. In the default configuration, the vehicle sends a notification to the user when the glass is obscured (i.e., when the quality of the view through the glass surface meets or falls below a selected obscuration threshold). The level of obscuration of the glass can be based on optical transmissivity, light levels, etc.

In box 208, the user decides whether he wants to receive a notification from the vehicle based on a key-on time, (i.e., a time at which a key-on event occurs). If the user selects (e.g., via the remote device 114) that the vehicle performs clearing based on key-on times, the method proceeds to box 210. Otherwise, the method proceeds to box 212. In box 210, the glass clearing system is configured to track typical, expected or predicted key-on times at the vehicle and to send a notification to the user at a selected time (e.g., 15 minutes) prior to the predicted key-on time. In box 212, the glass clearing system 104 is configured to monitor the glass surface 102 and send a notification to the remote device when the quality of the view meets an obscuration criterion (i.e., the default configuration). From either box 210 or box 212, the method proceeds to box 214.

In box 214, the user decides whether he wants to synchronize the glass clearing system with a weather forecast. If the user decides on this option, the method proceeds to box 216. In box 216, the glass clearing system is configured to allow the user to establish an automatic glass clearing schedule. Otherwise, the method proceeds from box 214 to box 218. In box 218, the glass clearing system is configured to monitor the glass surface and sends a notification when the quality of the view meets an obscuration criterion (i.e., the default configuration). From either box 216 or box 218, the method proceeds to box 220. In box 220, the configuration operation is complete, and the clearing operation can be commenced.

Figure 3:
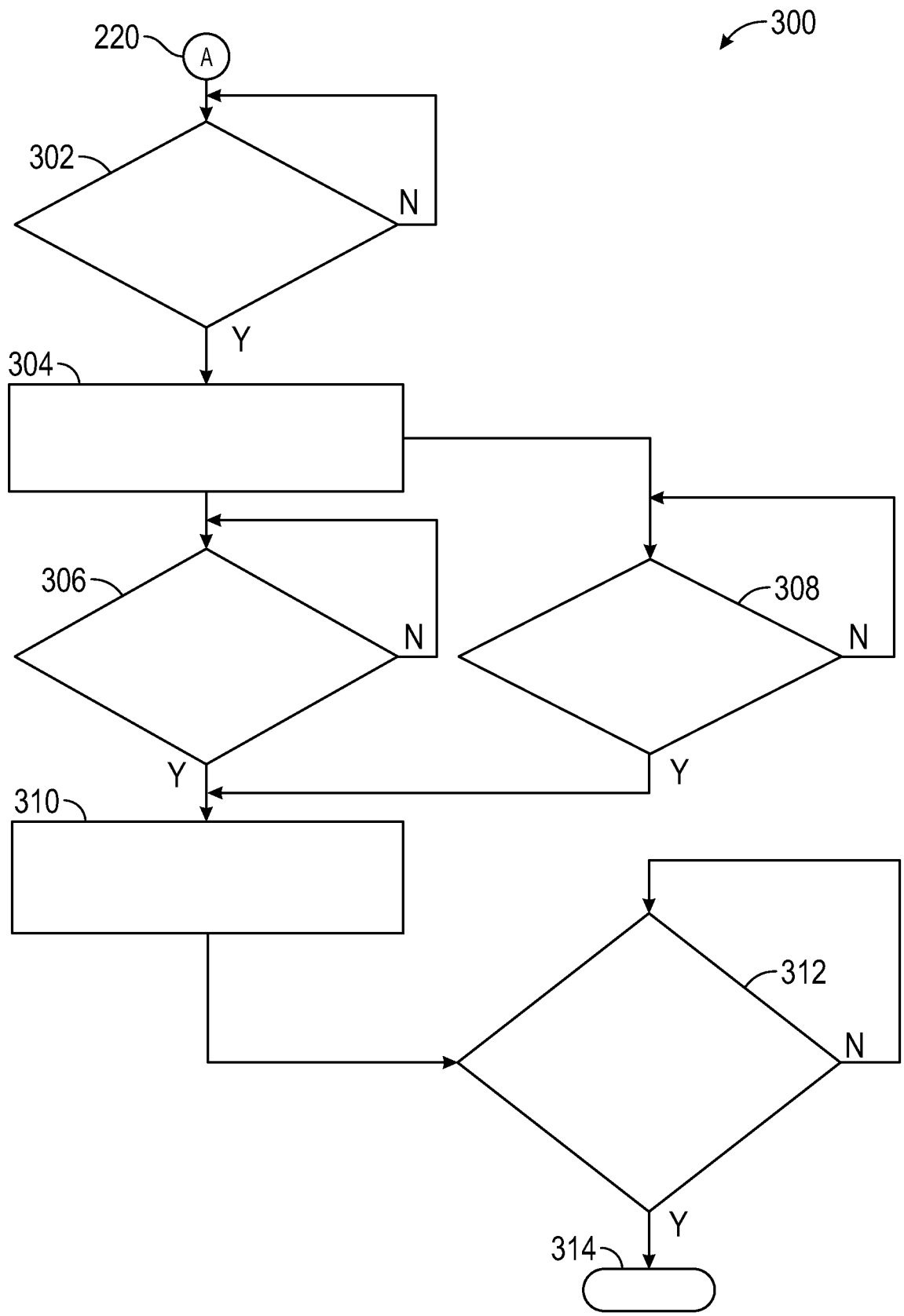
FIG. 3 is a flowchart illustrating a method of operating the glass clearing system that has been established through the configuration operation of FIG. 2, in an illustrative embodiment.

FIG. 3 is a flowchart 300 illustrating a method of operating the glass clearing system that has been established through the configuration operation of FIG. 2, in an illustrative embodiment.

In box 302, the processor operates a timer and compares the time to a clearing schedule. If the timer does not indicate that a clearing operation is to be initiated, the method loops back into box 302. Otherwise, when the current time and the clearing schedule indicate that it is time to initiate a clearing operation, the method proceeds to box 304.

In box 304, the quality of view of the windshield is checked, based on the selected criteria. If the method for checking the level is based on environmental parameters, the method proceeds to box 306. Otherwise, the method proceeds to box 308.

In box 306, the glass clearing system detects environmental parameters, such as rain, humidity, temperature, etc. and determines the quality of view from these environmental parameters. Illustrative conditions are the presence of either rain, fog, or frost on the glass. If the condition is indicative of the quality of view being greater than an obscuration threshold, the method loops back into box 306. Otherwise, the method proceeds to box 310.

In box 308, the camera obtains an image of the glass and the processor determines from the image whether the glass is obscured. If the quality of view through the glass is greater than an obscuration threshold, the method loops back into box 308. Otherwise, the method proceeds to box 310.

In box 310, the glass clearing system is activated to operate an appropriate glass clearing device. For example, if rain is indicated at the glass surface, the glass clearing device can be a windshield wiper. If frost is indicated on the glass surface, a heating system can be activated. Multiple clearing devices can be used. If, for example, cameras detect that a wiper is not causing the visibility to improve above a threshold in cold weather, a heating system can be implemented to thaw ice from the glass surface.

In box 312, the glass clearing system determines whether to terminate based on a termination criterion, such as an amount of battery usage or charge state of the battery, a selected time period or other customer specified criterion, an expectation that the vehicle will be stationary for an extended period, etc. The time period and/or charge state can be a pre-defined quantity or can be selected by the customer. In various embodiments, the termination criterion can be meet when the time for which the glass clearing device is on exceeds the time period or when the battery charges falls to the specified charge state. The decision to terminate can also be based on the quality of view or visibility rising above a selected threshold. Until the glass clearing system meets a termination criterion, the method loops back into box 312. Once the termination criterion is met, the method proceeds to box 314.

In box 314, the method ends by shutting off or turning off the glass clearing system. The processor shuts off the clearing device automatically after one of the termination criteria is met. The processor can send a notification to the user when the system times out. The notification can indicate an obscuration status or quality of view when the clearing device is shut down.

Figure 4:
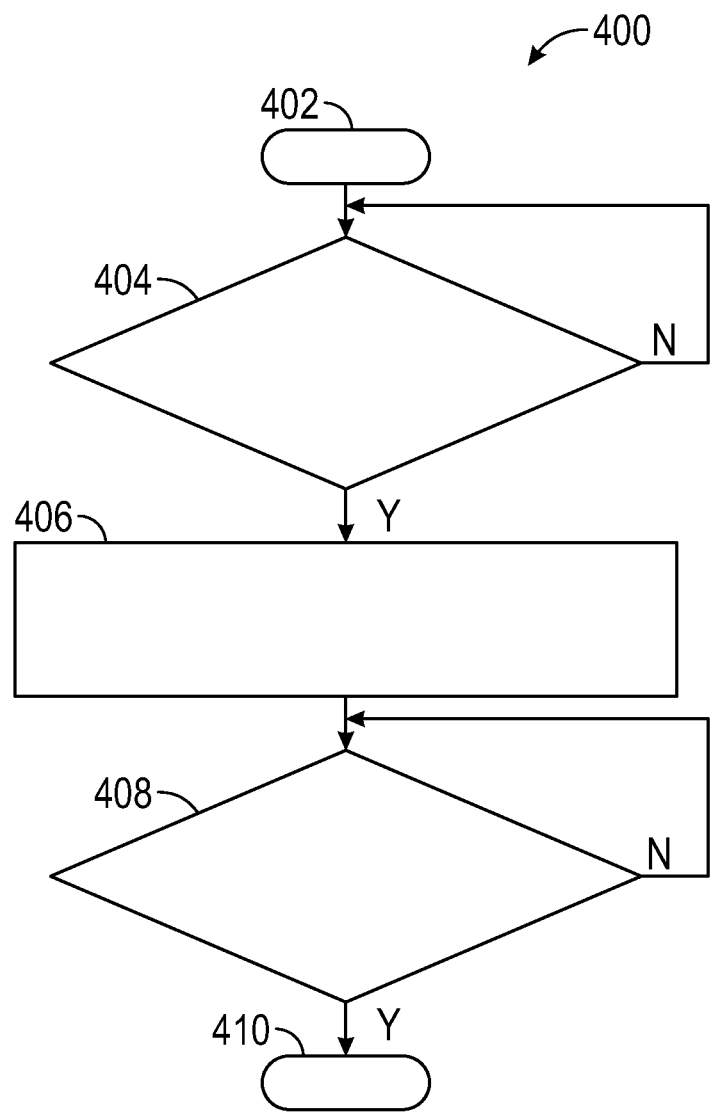
FIG. 4 shows a flowchart for a manual method for operating the glass clearing system.

FIG. 4 shows a flowchart 400 for a manual method for operating the glass clearing system. The method begins at box 402. In box 404, the processor checks for a signal indicating that the user is checking the vehicle remotely through the remote device. If the user is not checking, the method loops back into box 404. Otherwise, the method proceeds to box 406. In box 406, the method provides the user with either a view through the camera system or an atmospheric or environmental parameter, such as temperature, humidity, dew point, etc. In box 408, the user selects a glass clearing system and initiates the selected system. The method ends in box 410.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of clearing a glass surface of a vehicle, comprising:
   tracking a predicted key-on time at the vehicle;
   sending a notification from a glass clearing system of the vehicle to a remote device 15 minutes prior to the predicted key-on event;
   receiving a signal at the glass clearing system from the remote device, wherein the signal is indicative of an instruction for operating a glass clearing device of the glass clearing system;
   selecting the glass clearing device; and
   activating the glass clearing device to clear the glass surface based on the instruction.

2. The method of claim 1, wherein the instruction includes one of:
   (i) a configuration for an automatic operation the glass clearing system; and (ii) manually operating the glass clearing system.

3. The method of claim 2, wherein the instruction includes at least one of: (i) selecting the glass clearing device; (ii) activating the glass clearing device; and (iii) deactivating the glass clearing device.

4. The method of claim 1, further comprising providing to the remote device at least one of: (i) an image of the glass surface; and (ii) an environmental parameter indicative of a quality of view through the glass surface.

5. The method of claim 1, further comprising sending the notification to the remote device when one of: (i) a quality of view through the glass surface meets an obscuration criterion; and (ii) the glass clearing device is turned off.

6. The method of claim 1, further comprising shutting off the glass clearing device when one of: (i) a time for which the glass clearing device is activated exceeds a selected time period; (ii) a charge state of a battery of the vehicle meets a charge state criterion; and (iii) the vehicle is expected to be in stationary for a selected amount of time.

7. The method of claim 1, wherein selecting the glass clearing device further comprises selecting the glass clearing device from multiple clearing devices.

8. A glass clearing system for a vehicle, comprising:
a glass clearing device for clearing a glass surface;
a processor configured to:
track a predicted key-on time at the vehicle;
send a notification to a remote device 15 minutes prior to a predicted key-on event;
receive a signal from the remote device indicative of an instruction for operating the glass clearing device;
select the glass clearing device; and
activate the glass clearing device to clear the glass surface based on the instruction.

9. The glass clearing system of claim 8, wherein the instruction is one of: (i) a configuration for an automatic operation the glass clearing system; and (ii) a manual instruction for operating the glass clearing system.

10. The glass clearing system of claim 9, wherein the instruction includes at least one of: (i) selecting the glass clearing device; (ii) activating the glass clearing device; and (iii) deactivating the glass clearing device.

11. The glass clearing system of claim 8, wherein the processor is further configured to provide to the remote device at least one of: (i) a camera image of the glass surface; and (ii) an environmental parameter indicative of a quality of view through the glass surface.

12. The glass clearing system of claim 8, wherein the processor is further configured to send the notification to the remote device when one of: (i) a quality of view through the glass surface meets an obscuration criterion; and (ii) the glass clearing device is turned off.

13. The glass clearing system of claim 8, wherein the processor is further configured to shut off the glass clearing device when one of: (i) a time for which the glass clearing device is activated exceeds a selected time period; (ii) a charge state of a battery of the vehicle meets a charge state criterion; and (iii) the vehicle is expected to be in stationary for an selected amount of time.

14. The glass clearing system of claim 8, wherein the processor is further configured to select the glass clearing device from multiple clearing devices.

15. A vehicle, comprising:
a glass surface;
a glass clearing device for clearing the glass surface;
a glass clearing system for communication with a remote device and the glass clearing device, the glass clearing system including a processor configured to:
track a predicted key-on time at the vehicle;
send a notification to the remote device 15 minutes prior to a predicted key-on event;
receive a signal from the remote device indicative of an instruction for operating the glass clearing device;
select the glass clearing device; and
activate the glass clearing device to clear the glass surface based on the instruction.

16. The vehicle of claim 15, wherein the instruction is one of: (i) a configuration for an automatic operation the glass clearing system; and (ii) a manual instruction for operating the glass clearing system.

17. The vehicle of claim 16, wherein the instruction includes at least one of: (i) selecting the glass clearing device; (ii) activating the glass clearing device; and (iii) deactivating the glass clearing device.

18. The vehicle of claim 15, wherein the processor is further configured to provide to the remote device at least one of: (i) a camera image of the glass surface; and (ii) an environmental parameter indicative of a quality of view through the glass surface.

19. The vehicle of claim 15, wherein the processor is further configured to send the notification to the remote device when one of: (i) a quality of view through the glass surface meets an obscuration criterion; and (ii) the glass clearing device is turned off.

20. The vehicle of claim 19, wherein the notification is indicative of the quality of view of the glass surface when the glass clearing device is turned off.

* * * * *